(12) United States Patent
Ruble

(10) Patent No.: US 11,974,686 B1
(45) Date of Patent: May 7, 2024

(54) DEVICE AND METHOD RELATED TO HIDING DELIVERED PACKAGES

(71) Applicant: Tyler Ruble, Minneapolis, MN (US)

(72) Inventor: Tyler Ruble, Minneapolis, MN (US)

( * ) Notice: Subject to any disclaimer, the term of this patent is extended or adjusted under 35 U.S.C. 154(b) by 206 days.

(21) Appl. No.: 17/563,729

(22) Filed: Dec. 28, 2021

(51) Int. Cl.
*A47G 29/20* (2006.01)
*G02B 3/00* (2006.01)

(52) U.S. Cl.
CPC ............. *A47G 29/20* (2013.01); *G02B 3/005* (2013.01)

(58) Field of Classification Search
CPC .... A47G 29/20; A47G 29/1216; G02B 3/005; G02B 3/0062; G02B 30/10; G02B 30/27; F41H 3/00; F41H 3/02
USPC ...................................................... 232/22, 39
See application file for complete search history.

(56) References Cited

U.S. PATENT DOCUMENTS

| | | | | |
|---|---|---|---|---|
| 6,962,460 | B1 * | 11/2005 | Pratt .......................... | G09F 7/18 404/6 |
| 7,611,043 | B2 * | 11/2009 | Black .................. | A47G 29/1216 232/38 |
| 8,925,225 | B2 * | 1/2015 | Fiore .................. | A47G 29/1216 40/606.12 |
| 9,549,632 | B2 * | 1/2017 | Pickens .............. | A47G 29/1216 |
| 10,022,007 | B1 * | 7/2018 | Lucero ....................... | G09F 7/18 |
| 10,448,772 | B1 * | 10/2019 | Fiore .......................... | E01F 7/00 |
| 11,118,319 | B2 * | 9/2021 | Battjes ................. | A47G 29/122 |
| 11,352,754 | B2 * | 6/2022 | Parker, III ................ | E01F 7/02 |
| 2008/0314967 | A1 * | 12/2008 | Black .................. | A47G 29/1216 232/39 |
| 2010/0243977 | A1 * | 9/2010 | Middlebrook, Jr. ...... | E01F 7/00 256/12.5 |
| 2013/0232834 | A1 * | 9/2013 | Fiore .................. | A47G 29/1216 40/606.03 |
| 2014/0069996 | A1 * | 3/2014 | Pickens .............. | A47G 29/1216 232/17 |
| 2016/0073812 | A1 * | 3/2016 | Pickens ................ | A47G 29/122 232/38 |
| 2018/0292179 | A1 * | 10/2018 | Choi ....................... | G02B 30/27 |
| 2021/0172709 | A1 * | 6/2021 | Cramer .................. | G02B 30/27 |
| 2021/0238816 | A1 * | 8/2021 | Parker, III ................ | E01F 7/02 |

OTHER PUBLICATIONS

"A new take on creating an invisibility shield borrows from classical physics", Web Page <https://www.popsci.com/invisibility-cloak-how-it-works/>, 9 pages, Oct. 24, 2019.
"How to Become Clearly Invisible | Impossible Science at Home," Web Page <https://www.youtube.com/watch?v=RcD-op-1n2M>, 3 pages, May 26, 2021.

* cited by examiner

*Primary Examiner* — William L Miller
(74) *Attorney, Agent, or Firm* — Russell D. Nugent; The Humphries Law Firm, P.C.

(57) ABSTRACT

A method and a device used to hide packages left in a publicly accessible area such as a porch that includes using a lenticular lens array printed on a translucent or transparent sheet of material and positioned such that it is between a delivered package and a potential viewer. The device can include a plurality of sections of material to which the lenticular lens array is attached to shield the package from view from more than one direction. The lens array can be printed in different orientations to provide different visual effects.

17 Claims, 5 Drawing Sheets

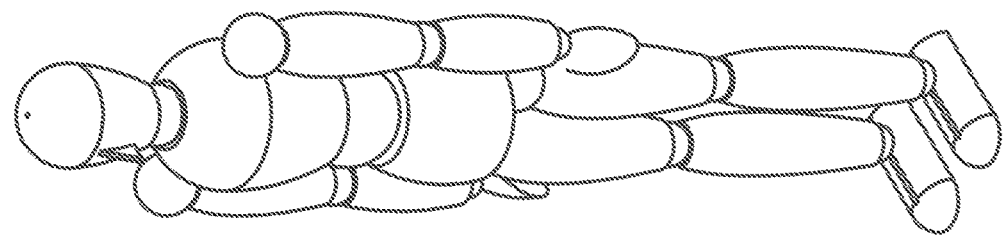
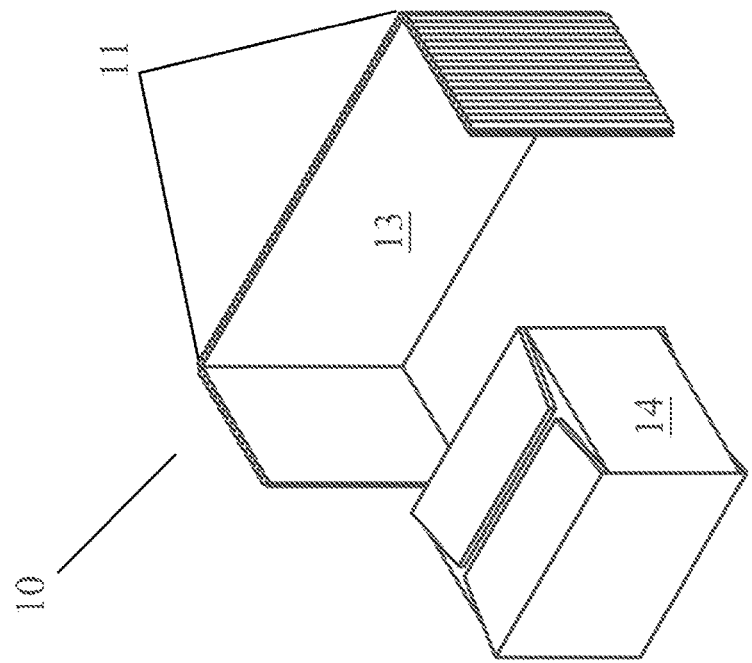
FIGURE 3

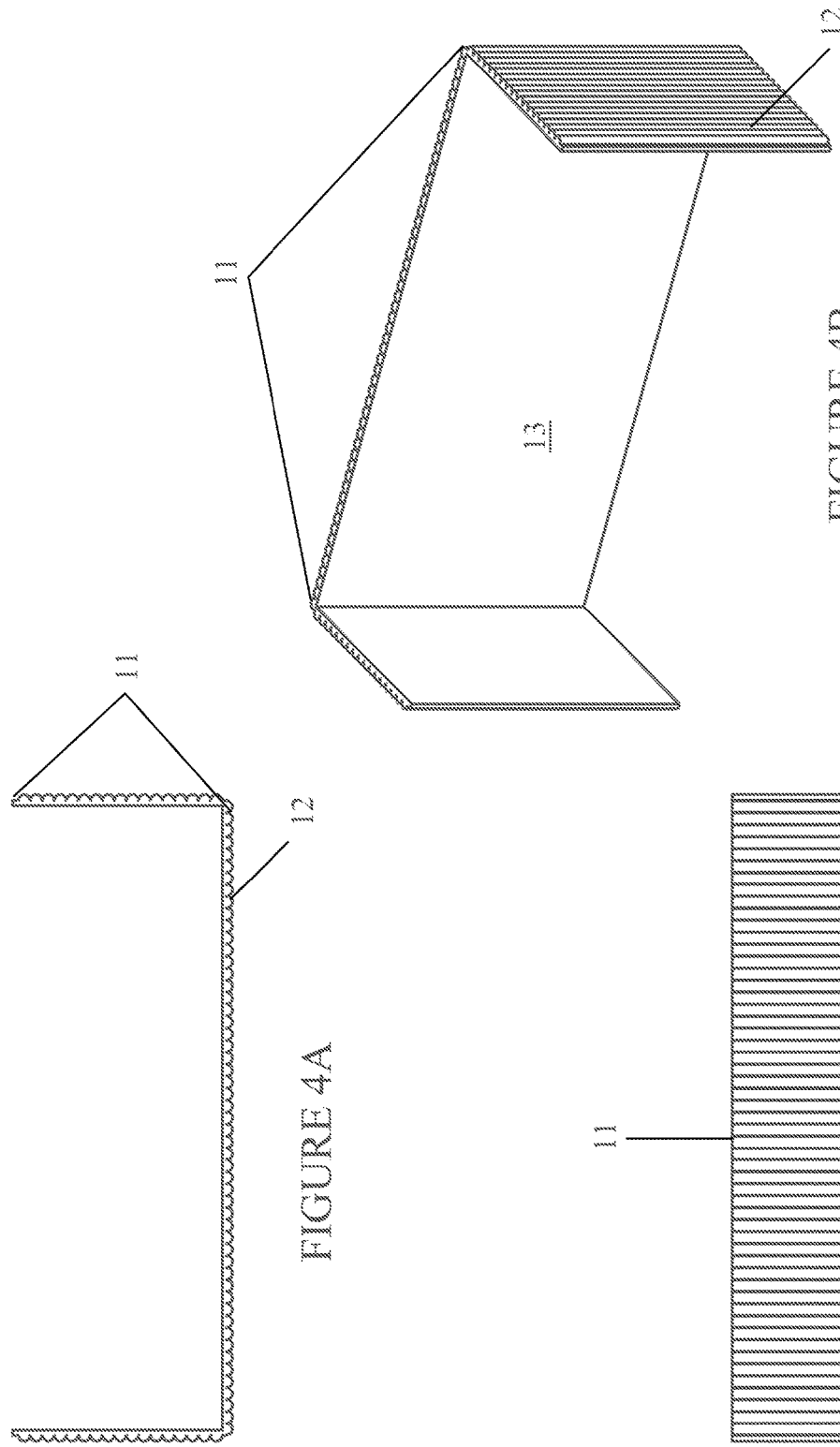

DEVICE AND METHOD RELATED TO HIDING DELIVERED PACKAGES

BACKGROUND OF THE INVENTION

(a) Field of the Invention

The present invention is in the technical field of package delivery. More particularly, the present disclosure relates to a novel use for lenticular lenses integrated into a device meant to hide or protect a package after it is delivered.

(b) Background Art

A lenticular lens is an array or collection of lenses that when viewed from different angles, reveals different portions of an image underneath by refracting or redirecting the light that passes through the lens array. Lenticular lens arrays are widely used in the printing industry to create certain effects such as 3-D effects and animation. Lenticular printing is a process in which lenticular lenses are used to create images with the illusion of depth or the ability to change or move as the image is viewed from different angles. A lenticular image is created form at least two images and are combined with a lenticular lens. The images are divided into "strips" that are then interlaced with one or more images in a process called splicing. The images are printed on the back of substrate, like a piece of plastic, with a series of lenticular lenses printed on the opposite side. The lenses are aligned with the images so that light reflected by each strip is sent in a different direction, but light from each strip making up a single image is all reflected in the same direction. The lenticular lenses allow the viewer to see the slices of images from different angles.

Lenticular lenses can bend the full spectrum of visible light. The lenses refract light as it passes through them, essentially changing the speed and direction of the light. One side of a plastic sheet is embossed with a series of tiny corrugations, called lenticules, and are generally sized and spaced uniformly across the surface to which they have been applied. The shape of the lenticules determines some of the optical effects they produce, i.e. the lenses can be printed with different curvatures to produce different viewing angles. As a result, the light is dispersed and there are sections of the plastic sheet where little to no light passes through. A viewer looking through a clear or translucent lenticular lens array sees a distorted image of anything that is on the other side of the array. Light that passes through the array is refracted and as a result, may not reflect off an object behind the array back to the viewer so they can see the object.

The present invention is a device and method of hiding packages that are left in public places. Millions of packages are mailed throughout the United States every year and it is common practice for those packages to be left on porches and doorsteps unattended for a lengthy period of time. As a result, there is a large problem with package theft in the United States. A suitable device and method of hiding packages left unattended in public view is sorely needed.

BRIEF SUMMARY OF THE INVENTION

The present disclosure relates to a device and method of hiding packages that are left in public view. Specifically, the inventor has discovered that lenticular lens printing can be applied to colorless sheets of material, such as translucent plastic, to create a device that is used to hide something placed behind it. Sheets of material printed with a lenticular lens array are formed in the shape of a container of some kind. The size and shape of the container can vary as desired. Some embodiments are merely three-sided sheets of material printed with the lenticular lens array(s) such that an object the size of a package can be placed behind the sheet of material. Viewed from a distance, the light is bent or refracted as it passes through each portion of the lenticular lens array enough that a solid object placed behind the sheet of material virtually disappears. The object is hidden enough from view that a person viewing the sheet of material from a distance of a few feet away cannot see the object placed behind it. Other embodiments include a four to six-sided container made of translucent material printed with a lenticular array. Other embodiments may use sheets of material that are colored or tinted to help the device blend in with its surroundings.

The device is made through a process called wet-mounting. A lenticular lens array is printed on a clear piece of material, generally some form of plastic. A separate plastic sheet, preferably acrylic, is wet mounted to the lenticular lens array. Specifically, a sheet of acrylic is dusted and cleaned with soapy water. A layer of soapy water is left on the surface of the acrylic. Next a solution of soapy water is applied to a surface of the lenticular lens array. Either the lenticular lens array or the sheet of plastic/acrylic will have a clear adhesive applied to it. For ease and convenience that clear adhesive can be applied in advance and attached to a release liner to make that particular component easier to store and transport. The soapy water solution is added to the portion of the component that has the adhesive attached to it. The lens array is then placed over top of the sheet of acrylic such that the two sides sprayed with the soapy water solution are in contact with each other. The clear adhesive will attach the two components together as the water dries. A squeegee can be used to force additional water out from between the two sheets where it can be picked up by an absorbent material such as a cotton rag.

The lens array itself can take more than form. Lenticular lenses can be printed on a sheet of material in a variety of different orientations depending on how one desires light to be refracted. Specifically, most lens arrays are printed vertically, but they can be printed horizontally as well.

BRIEF DESCRIPTION OF THE SEVERAL VIEWS OF THE DRAWINGS

FIG. 3 is a perspective view of a package being hidden behind the device in accordance with the disclosed method;

FIG. 4A is a top plan view if an embodiment of the device;

FIG. 4B is a top perspective view thereof;

FIG. 4C is a front plan view thereof;

DETAILED DESCRIPTION OF THE INVENTION

Figure 1:
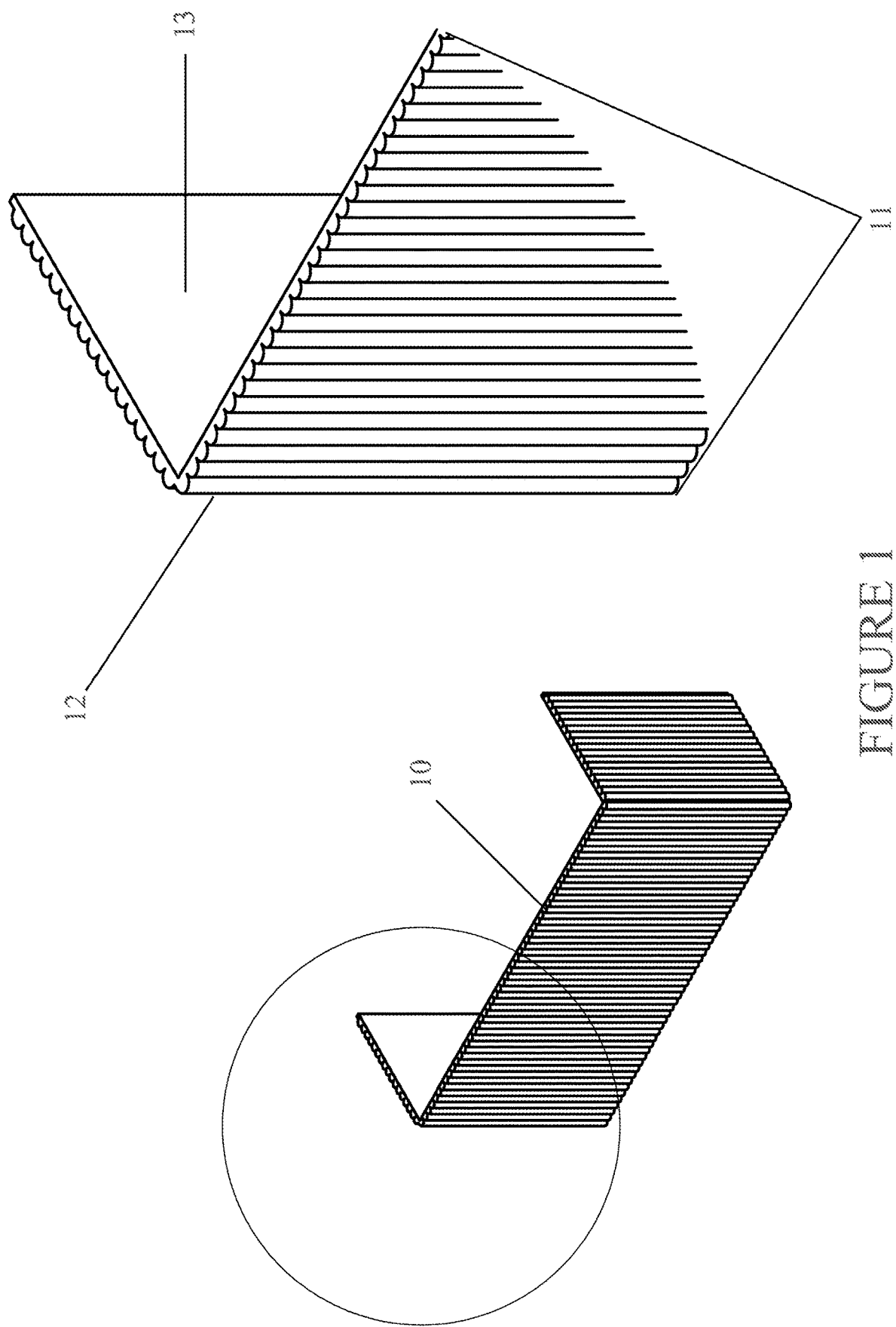
FIG. 1 is close-up a perspective view of a first embodiment of the present invention.

FIG. 1 shows a close-up view of an embodiment of the presently disclosed device 10. Specifically, FIG. 1 shows a lenticular array 11 that is composed of a series of lenticules 12 or textured strips of material that are embossed onto a surface of a sheet of material 13 that is translucent, but preferably transparent. FIG. 1 shows the lenticules 12 as raised columns or portions of the sheet of material 13 itself. The curvature of the lenticules 12 dictates the viewing angle of the lenticule. Each lenticule 12 refracts or alters the pathway of any beam of light passing therethrough. The material 13 itself can vary as needed with plastic being the material used in the inventor's preferred embodiments and anticipated best mode of the device. The material 13 can be made of a variety of plastics or glass or other material that allows some light to pass through. The more transparent the material 13 is, the more effective the device is at hiding an object (not shown) placed behind it.

Using a translucent material is desirable because it can help create the illusion that there is nothing on the porch behind it. If a potential thief sees a colored, opaque device on the front porch, then they may well conclude there is something there that someone is trying to hide. If they see a translucent device but cannot see a package positioned behind the material they are viewing, they are more likely to pass by the house without discovering the item being concealed.

Figure 2:
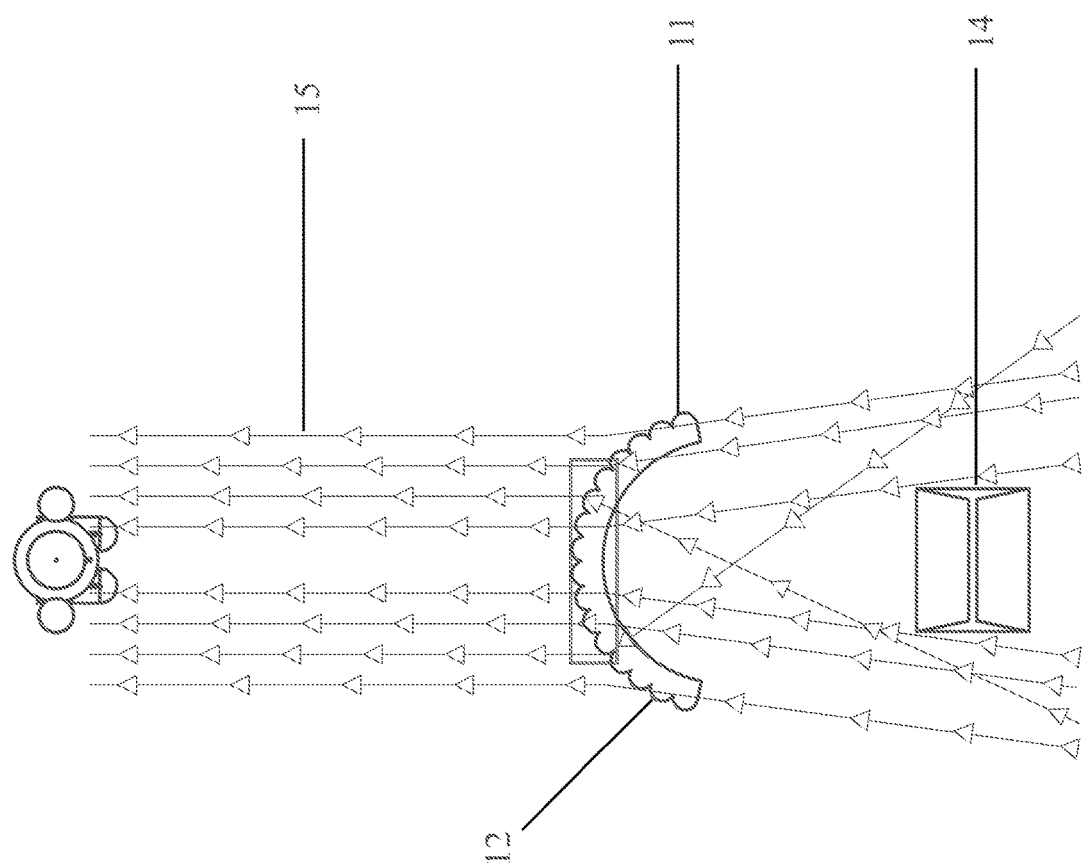
FIG. 2 is a top plan view illustrating how the device refracts light around a package.
Figure 5B:
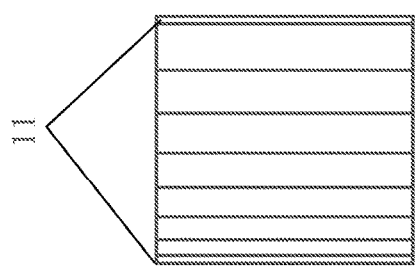
FIG. 5B is a side perspective view thereof.
Figure 5D:
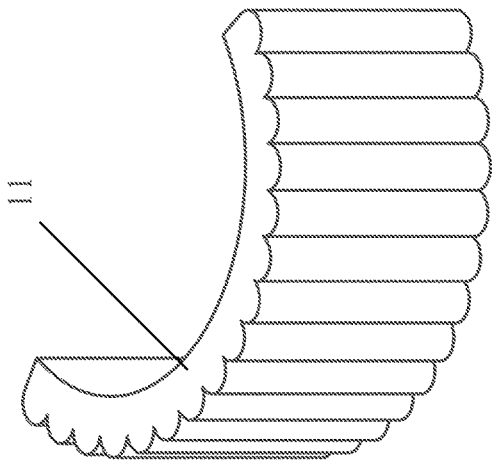
FIG. 5D is a top side perspective view thereof.
Figure 5A:
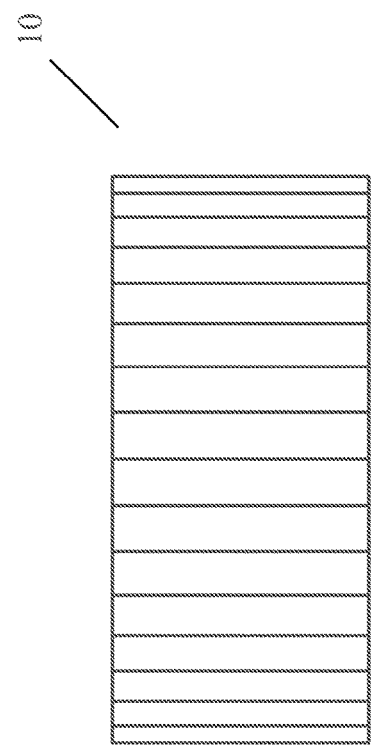
FIG. 5A is a front plan view of another embodiment of the device.
Figure 5C:
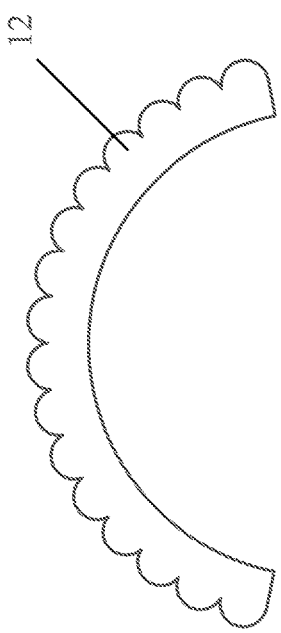
FIG. 5C is a top plan view thereof.

FIG. 2 shows how the device 10 containing the lenticular array 11 refracts light around an object 14 placed behind it. In order for a viewer on the other side of the array 11 to see the object 14 behind the array 11, light 15 has to reflect off of the object 14 and reach the viewer. As shown in FIG. 2, each ray of light 15 entering a lenticule 12 is redirected such that it does not pass straight through to the other side of the lenticule 12. As a result, some of the light passing through the device 10 never reaches the object behind the array 11 and therefore cannot reflect off of the object 14 and reach the viewer. In addition, the device offers a second layer of protection for the object 14 being concealed in that the light rays 15 that do reach and are reflected off the object 14 behind the lenticules 12 are refracted when they pass back through the array 11 such that they do not reach the viewer on the other side of the array 11. Placing an object 14 in position behind such an array 11 distorts the light passing through the array 11 and thus hides or conceals the object 14 behind the array.

FIG. 3 shows a device 10 printed with a lenticular array 11 placed in front of a package 14 that has been delivered to an individual's porch. As light passes through the sheet of material 13 to which the array 11 has been attached or with which it has been integrated, it is redirected around the package thereby distorting the image of if not concealing the object 14 itself.

FIGS. 4A, 4B and 4C show a close-up view of the lenticular array 11 applied to a separate sheet of transparent material 13. A separate plastic sheet 13, preferably acrylic, is wet mounted to the lenticular lens array 11. Specifically, a sheet of acrylic is dusted and cleaned with soapy water. A layer of soapy water is left on the surface of the acrylic. Next a solution of soapy water is applied to a surface of the lenticular lens array 11. Either the lenticular lens array 11 or the sheet of plastic/acrylic 13 will have a clear adhesive applied to it. For ease and convenience that clear adhesive can be applied in advance and attached to a release liner to make that particular component easier to store and transport before assembly. Then the release liner can be removed to reveal the adhesive during assembly. The soapy water solution is added to the portion of the material 13 that has the adhesive attached to it. The lens array 11 is then placed over top of the sheet of acrylic 13 such that the two sides sprayed with the soapy water solution are in contact with each other. The clear adhesive will attach the two components together as the water dries. A squeegee can be used to force additional water out from between the two sheets where it can be picked up by an absorbent material such as a cotton rag.

FIGS. 5A, 5B, 5C and 5D show an embodiment of the device in which the device 10 has a curved shape. The array 11 is made either by printing or embossing the individual lenticules 12 onto a single sheet of material 13 or attaching a sheet of material 13 that is printed with the individual lenticules 12 to another sheet of material 13. The device 10 can have any number of sides desired and can be shaped like a box or any other form desired—in this case, the device is a curved, partial semi-circular structure. A lenticular array 11 printed on each surface of the device 10 that may face a viewer distorts the image of what is on the other side of the array 11 to the point that someone looking at the lenticular array 11 from a small distance, the distance from someone's porch to the street for example, will not see a clear image of the object 14 behind the array 11, if they can see the object 14 at all. The method disclosed in this invention decreases a thief's ability to perceive the package form a distance and thus to choose to target a particular home or package.

The inventor's preferred embodiments and anticipated best mode of the device are made of a lenticular array applied to a translucent piece of plastic; however, as mentioned above, other materials with the same properties can be used to perform the same method. In practice, a shield featuring the lenticular array is placed in an area that is not completely private such as someone's front porch. When a package is delivered to that same location, it is placed behind the shield featuring the lenticular array. The lenticular array refracts light that is passing through it and thus decreases the amount of light that contacts the package and thus the amount of light reflected by eh package. Since objects cannot be seen until light reflected from them reaches the human eye, the decrease in light hitting the package positioned behind the array decreases the package's visibility from any distance thereby at least partially hiding the package from prying eyes. The inventor has determined that a device with 100 lenticules per inch (lines per inch or LPI) and a viewing angle of 30 degrees plus or minus 5 degrees is optimal for a device that will be viewed from 10-100 feet away.

The advantages of the present invention include, without limitation, the ability to hide an object that is left in a public or partially public space such as a package on a front porch or other delivery area. A device practicing this method is easy to transport and relocate making it more versatile.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method of hiding a delivered package comprising:
   printing a lenticular lens array on a surface of a transparent sheet of material;
   placing the transparent sheet of material in a location where the package is to be delivered;
   placing the package behind the transparent sheet of material printed with a lenticular lens array such that a person walking near the package will have to look through the transparent sheet of material printed with a lenticular lens array to see the package.

2. The method of claim 1 further comprising:
   attaching the transparent sheet of material printed with the lenticular lens array to a separate transparent sheet of material using wet mounting.

3. The method of claim 2 wherein there are 100 lenticules per inch of the transparent sheet of material.

4. The method of claim 3 wherein the translucent material printed with the lenticular lens array and the separate sheet of transparent material are curved.

5. The method of claim 2 wherein the translucent material printed with the lenticular lens array and the separate sheet of transparent material are curved.

6. The method of claim 1 further comprising a plurality of lenticular lens arrays printed on a plurality of sheets of transparent material.

7. The method of claim 6 further comprising forming a three-sided structure with the plurality of sheets of transparent material.

8. The method of claim 7 wherein there are 100 lenticules per inch of the transparent sheets of material.

9. The method of claim 6 wherein there are 100 lenticules per inch of the transparent sheets of material.

10. The method of claim 1 further comprising forming a three-sided structure with the sheet of transparent material printed with the lenticular lens so as to hide the package from more than one direction.

11. The method of claim 10 wherein there are 100 lenticules per inch of the transparent sheet of material.

12. A method of preventing theft of a delivered package from a publicly accessible area comprising:
    providing a screen made of a clear plastic material printed with a plurality of lenticular lenses;
    placing the screen in the publicly accessible area wherein a delivery person places a package behind the screen when delivering the package to the publicly accessible area.

13. The method of claim 12 wherein the screen is folded into a plurality of sections to cover the package from more than one direction.

14. The method of claim 13 wherein the lenticular lenses are printed on the screen vertically.

15. The method of claim 13 wherein the lenticular lenses are printed on the screen horizontally.

16. The method of claim 12 wherein the screen is curved.

17. A method of concealing an object comprising:
    providing a first sheet of transparent material;
    printing a lenticular lens array on a second sheet of transparent material;
    attaching the first sheet of transparent material to the second sheet of transparent material using wet mounting to create a device;
    placing the device in an area where the object needs to be concealed; and
    placing the object between the device and the viewer.

* * * * *